United States Patent Office 3,135,723
Patented June 2, 1964

3,135,723
PROCESS FOR COPOLYMERIZING ALPHA-METHYL STYRENE AND METHYL METHACRYLATE
Jan E. Vandegaer, Easton, Pa., assignor to J. T. Baker Chemical Company, Phillipsburg, N.J., a corporation of New Jersey
No Drawing. Filed Aug. 19, 1960, Ser. No. 50,583
6 Claims. (Cl. 260—86.7)

This invention relates to a new process of polymerizing $\alpha$-alkyl styrenes with alkyl methacrylates.

Copolymers of certain alkyl styrenes and alkyl methacrylates have been prepared. When $\alpha$-methyl styrene and methyl methacrylate are copolymerized in proper proportions at temperatures within the range 70°–160° C. using suitable free radical producing catalysts, until an intrinsic viscosity greater than 0.25 is reached, excellent products are obtained. These copolymers are transparent, water white, light stable, hard, and have good mechanical stability, are mar and scratch resistant and are resistant to strong detergents and alkalis. They are also thermoplastic but will withstand boiling water. They also have excellent weathering characteristics. However, the best known process of copolymerizing these monomers to obtain these desirable properties to a maximum degree requires a long period of time, about seven days, and the resulting polymer has a relatively high melt viscosity which makes it difficult to mold.

Among the objects of the present invention, therefore, is to provide a process by which $\alpha$-methyl styrene and methyl methacrylate can be copolymerized in a much shorter period of time to obtain products with a lower melt viscosity yet having the same physical properties. These polymers are easily molded by conventional processes.

I have discovered that the long time required to polymerize $\alpha$-methyl styrene with methyl methacrylate is due to the choice of the free radical producing catalysts which have heretofore been made. Among the most suitable free radical producing catalysts for the polymerization of unsaturated monomers are the organic peroxides which are the general type R—O—O—R' wherein R and R' may be alkyl, acyl or hydrogen. Although these organic peroxides are often referred to as catalysts, they are actually initiators of the polymerization reaction in that they tend to cleave and give the free radicals RO· and R'O·. These free radicals may form decomposition products but also react with unsaturated monomers to initiate polymerization by adding to the double bond.

Polymerization catalysts, or initiators, such as benzoyl peroxide and di-tertiary butyl peroxide, have been used in the polymerization of $\alpha$-methyl styrene and methyl methacrylate. However, benzoyl peroxide has a half life of only about 42 minutes at the preferred polymerization temperature, 95° C. and within about five hours virtually all of the catalyst has decomposed and from that time on, the polymerization proceeds thermally. This latter reaction is very slow. When higher polymerization temperatures are used to increase the rate of polymerization, it is found that the final products do not have the desirable qualities of the polymer prepared by the longer process. This is because at the higher temperatures the less reactive monomer, $\alpha$-methyl styrene, enters the growing polymer chain less frequently, and the tendency of the two monomers to enter the polymer chain in an alternating manner is lessened. As a result the final product contains less $\alpha$-methyl styrene which shows up in a lowering of the heat distortion temperature. Attempting to speed up the polymerization process by raising the temperature after the bonzoyl peroxide has left the system will, therefore, not yield the most satisfactory final polymer.

On the other hand, when di-tertiary butyl peroxide is used as the free radical producing catalyst, other difficulties are encountered. This catalyst has a half life of 450 hours at 95° C. which is too long for an efficient and economical process. At higher temperatures di-tertiary butyl peroxide decomposes at a faster rate, but then the final product obtained does not have the best possible properties for reasons outlined above.

The present invention is based upon my discovery that certain polymerization initiators can be selected which will enable the major part of the polymerization reaction to take place within the preferred temperature range of 80°–110° C. whereby the tendency of the two monomers to enter the polymer chain in an alternating manner is adequate and the time required to achieve essentially complete polymerization is not unduly long.

A still further improvement in the polymerization process can be achieved by selecting two or more polymerization catalysts which have different rates of decomposition as will be explained hereinafter.

The preferred catalyst of the present invention is cyclohexanone peroxide which has a half life of seven hours at 95° C. The choice of this catalyst makes it possible to carry out the major part of the polymerization process at temperatures within the preferred range of 90°–100° C., while active catalyst is being produced in the polymerizing mixture. There are a few other catalysts having about the same rate of decomposition which may also be used to advantage over those previously suggested. Among these that may be mentioned include tertiary butyl peracetate which has a half life at 102° C. of ten hours, and di-tertiary butyl diperphthallate, tertiary butyl perbenzoate and methyl ethyl ketone peroxide which have a half life at 105° C. of ten hours. Other organic peroxides currently available have half lives which are either too short or too long for best results. Azo-initiators which have a half life of 10 hours within the temperature range 80°–110° C. may also be used. Among these is azo-di(cyclohexane-carbonitrile) which has a half life of 10 hours at about 88° C.

As mentioned above, still better results can be obtained by selecting two or more different catalysts which have different half lives to perform particualr parts of the polymerization process. For instance, it is desirable to use a small amount of a polymerization catalyst which has a half life of ten hours at temperatures higher than 100° C. to finish off the polymerization. Ordinarily the polymerization is carried out for the most part at temperatures within the range of 90°–100° C., but higher yields may be obtained by raising the temperature during the last few hours of the polymerization cycle up to as high as 150° C. In order that there be some polymerization catalyst remaining in the unfinished polymer at this time, a polymerization catalyst which decomposes at a higher temperature is selected. For this purpose I may use polymerization catalysts having a half life of ten hours at 100°–130° C. Among these may be mentioned dicumyl peroxide and di-tertiary butyl peroxide. The use of these catalysts makes it possible to complete the polymerization with high yields by providing free radicals at the end of the polymerization cycle.

A still further improvement in the process may be obtained by using polymerization catalysts having a half life of ten hours at temperatures of 60°–75° C. By using catalysts of this type, free radicals are produced during the early stages of the polymerization as the monomer mixture is being brought up to 90°–100° C. Among such catalysts are benzoyl peroxide, lauroyl peroxide and caprylyl peroxide.

The total catalyst concentration may vary from 0.1–0.5 percent on a weight basis. The catalysts having a low rate of decomposition at temperatures in excess of 100° C. as well as the catalyst which has a high rate of decomposition at temperatures below 90° C. are used in relatively small amounts, for example, from 0.01 to 0.1 percent of the total reaction mixture. By choosing efficient catalyst mixtures, it is possible to perform the polymerization in three days or less, whereas using catalysts heretofore recommended, the polymerization required up to seven days. An equally important consideration is the fact that, although they possess the same physical properties, the polymers have a higher melt index, whereby the material flows more readily when heated and is, therefore, easy to mold.

To illustrate the invention in more particularity, a number of examples will be given showing how the process of the present invention yields better products in a shorter period of time than heretofore considered possible. Example I illustrates the use of a catalyst with too short a half life. The heating cycle is one which yields a polymer having optimum properties with that catalyst system. Example II illustrates the impractability of speeding up the polymerization by increasing the temperature. Example III compares the present new process with an older one.

EXAMPLE I

Several sixteen fluid ounce bottles were filled with 80 grams of alpha-methyl styrene and 240 grams of methyl methacrylate, 640 milligrams of benzoyl peroxide and 640 milligrams of tertiary dodecyl mercaptan (a polymerization regulator). The bottles were thoroughly purged with nitrogen and then sealed with an air-tight seal. These bottles were heated in an electrically heated air oven and removed at different time intervals. The heating cycle was four days at 95° C. and three days at 115° C. The conversion was measured from time to time on each bottle by dissolving 0.3 gram of the raw polymer in a small quantity of chloroform and re-precipitating by pouring the solution into a large excess of methanol and vacuum drying the re-precipitated copolymer to constant weight at 80° C. The percent by weight of the precipitated polymer of the weigth of the raw polymer is the estimated conversion.

| Hours of reaction: | Percent conversion |
|---|---|
| 12 | 18.55 |
| 24 | 28.20 |
| 36 | 38.20 |
| 48 | 49.60 |
| 60 | 68.00 |
| 72 | 71.20 |
| 84 | 75.05 |
| 96 | 76.10 |
| 120 | 83.15 |
| 144 | 86.80 |
| 168 | 89.65 |

As will be seen, it required seven days to obtain maximum conversion using benzoyl peroxide in this polymerization cycle.

EXAMPLE II

Seventy-five parts by weight of methyl methacrylate and 25 parts by weight of alpha-methyl styrene were polymerized with 0.1 percent of tertiary butyl perbenzoate, 0.1 percent of di-tertiary butyl peroxide and 0.1 percent of tertiary dodecyl mercaptan. The following heating cycle was followed:

Heating Cycle

| Hours: | ° C. |
|---|---|
| 4 | 100 |
| 3 | 105 |
| 16 | 115 |
| 8 | 125 |
| 16 | 134 |

The polymerization was carried out in glass bottles which were heated in an electrically heated air oven. The catalyst and regulator were dissolved in the monomers, and the bottles were thoroughly purged with nitrogen and then sealed with an air tight seal. Periodic analysis of the material in the bottles showed after two days a maximum conversion of 84 percent was obtained.

Other properties of the polymer were determined at the end of the heating cycle with the following results:

| | |
|---|---|
| Intrinsic viscosity | .430 |
| Residual methyl methacrylate_____percent__ | .9–1.1 |
| Residual alpha-methyl styrene_____do__ | 8.6–8.9 |
| Color _____do__ | 1.0–1.1 |

The polymer extrusion devolatilized with bubbles on a first pass and gave a heat distortion, ASTM D648–45T, of 106° C. After a second pass, the heat distortion temperature was 114° C. The precipitated polymer (alcohol insoluble) had a heat distortion of only 119.5° C. compared to 130° C. for the preferred material. The carbon hydrogen analysis showed that the precipitated polymer contains only 16.9 percent alpha-methyl styrene which explains the low heat distortion temperature.

This example shows that while the reaction rate can be increased by increasing the temperature, the tendency of the monomers to enter the polymer chain in an alternating manner is disturbed at the higher temperatures, and less of the alpha-methyl styrene is incorporated in the polymer. As a result, the product does not have the desirable properties of copolymers polymerized at lower temperatures.

EXAMPLE III

A series of polymers were prepared using 25 percent by weight of alpha-methyl styrene and 75 percent by weight of methyl methacrylate as in the two preceding examples. The catalyst consisted of 0.15 percent cyclohexanone peroxide and 0.05 percent dicumyl peroxide. Tertiary dodecyl mercaptan was used as a polymerization regulator or stabilizer in the amounts shown below.

The material were polymerized in glass bottles, purged with nitrogen and heated in an electrically heated air oven as before. The polymerization cycle was 45 hours at 95° C., followed by 17 hours at 115° C., and finally 8 hours at 125° C. for a total of 70 hours.

The results of this series of polymerizations are shown in the following table.

TABLE I

| No. | 1 | 2 | 3 | 4 | 5 |
|---|---|---|---|---|---|
| TDM (percent) | .20 | .24 | .28 | .32 | .36 |
| Viscosity [n] | .370 | .335 | .300 | .285 | .220 |
| Alcohol Insoluble (percent) | 89.4 | 87.3 | 86.2 | 84.6 | 83.9 |
| Residual Monomer, percent MMA | 0.30 | 0.40 | 0.55 | 0.80 | 0.90 |
| Residual Monomer, percent α-MS | 4.85 | 5.60 | 5.25 | 5.80 | 5.25 |
| Ht. Dist. Extrd.,° C | 114 | 118 | 118 | 116 | 118 |
| Ht. Dist. Pptd.,° C | 128 | 128 | 128 | 125 | 124 |
| Tensile Strength, p.s.i. (ASTM–D638) | 10,200 | 8,700 | 9,700 | 7,600 | 6,000 |
| Flexural Strength, p.s.i. at 77° F. (ASTM–D790) | 15,800 | 15,600 | 15,200 | 12,300 | 12,700 |

Copolymers prepared as just described have remarkable resistance to boiling water and specimens have been immersed in boiling water for periods in excess of six months without losing their water-white optical clarity or shape or changing in physical dimensions. They are also highly resistant to strongly alkaline detergents.

Similarly, a series of polymerizations was run with the same materials and under the same conditions except that the catalyst consisted of 0.2 percent benzoyl peroxide and the polymerization cycle was four days at 85° C. and three days at 115° C. for a total of seven days. The results of this series is shown in the following table.

TABLE II

| No. | 1 | 2 | 3 | 4 | 5 |
|---|---|---|---|---|---|
| TDM (Percent) | .20 | .24 | .28 | .32 | .36 |
| Viscosity [n] | .370 | .310 | .300 | .280 | .285 |
| Alcohol Insoluble (percent) | 88.3 | 87.4 | 86.8 | 86.5 | 85.7 |
| Residual Monomer, percent MMA | 1.30 | 3.55 | 4.20 | 3.45 | 4.45 |
| Residual Monomer, percent α-MS | 2.80 | 3.10 | 3.85 | 3.00 | 3.20 |
| Ht. Dist. Extrd.,° C | 123 | 118 | 118.5 | 128 | 120 |
| Ht. Dist. Pptd.,° C | 127 | 126.5 | 122.5 | 125 | 127 |
| Tensile Strength, p.s.i. (ASTM-D638) | 9,900 | 9,700 | 9,000 | 9,600 | 6,800 |
| Flexural Strength, p.s.i. at 77° F. (ASTM-D790) | 16,400 | 14,600 | 13,100 | 16,000 | 12,100 |

As will be seen from the above tables, the polymer produced by the short cycle made possible by the selection of cyclohexanone peroxide as the polymerization catalyst had tensile and flexural strengths comparable to the polymer prepared by the seven day cycle. The heat distortion temperature of the short cycle polymer was equally as good or better than the heat distortion temperatures of the long cycle polymer. The optical and other properties of the two polymers were substantially the same.

More importantly, it was found that the material made with the short cycle polymerization had a higher melt index than the long cycle polymer. This property enables the polymer of the short cycle to be extrusion molded more readily.

Four samples from the above polymerizations were subjected to melt viscosity determinations. The procedure was in accordance with ASTM D1238 except insofar as specific shear stresses and specific temperatures not conforming therewith were used. The objective of the work was to obtain melt flow rates at shear-stress of 5 and 20 p.s.i. Using orifice geometry according to the ASTM specifications, pressures of 76.4 and 305 p.s.i.g. were established for the desired shear stresses of 5 and 20 p.s.i. The extrusion plastometer was heated to the desired temperature (400° or 475° F.) and maintained at this temperature. In the following table the amounts extruded per ten minutes are given in grams and hence correspond to melt indices.

TABLE III

| Sample | 400° F. | | 475° F. | |
|---|---|---|---|---|
| | 5 p.s.i. | 20 p.s.i. | 5 p.s.i. | 20 p.s.i. |
| 70 Hour Cycle #1 | 0.071 | 0.56 | 3.6 | 32 |
| 70 Hour Cycle #3 | 0.100 | 0.66 | 4.9 | 43 |
| 168 Hour Cycle #1 | 0.060 | 0.35 | 2.4 | 24 |
| 168 Hour Cycle #3 | 0.051 | 0.41 | 2.6 | 19 |

The materials made with the more efficient shorter cycle have higher melt indices which means that the material flows better than the corresponding polymers made with the longer cycle. This is an important consideration in evaluating the plastic for commercial molding operations.

EXAMPLE IV

Although the preferred manner of practicing the present invention employs two or more catalysts which give a maximum production of free radicals at different temperatures in the polymerization cycle, superior results to those heretofore obtained can be achieved by using a single polymerization catalyst which has a half-life of 10 hours within the temperature range of 80°–110° C. To illustrate this, a series of polymerizations was run using cyclohexanone peroxide, which has a 10 hour half-life at 91° C., as the catalyst. This catalyst was used at levels of 0.2 and 0.5 percent as shown in the following table. Three different ratios were used. The heating cycle was 77 hours at 95° C. The results are shown in the following table:

TABLE IV

| Run No. | 1 | 2 | 3 | 4 | 5 | 6 |
|---|---|---|---|---|---|---|
| Percent α-methyl styrene | 15 | 15 | 25 | 25 | 35 | 35 |
| Percent methyl methacrylate | 85 | 85 | 75 | 75 | 65 | 65 |
| Percent catalyst | .2 | .5 | .2 | .5 | .2 | .5 |
| Alcohol Ins | 91.5 | 94.5 | 91.2 | 90.7 | 80.5 | 84.6 |
| Intrinsic Viscosity, n | 1.060 | .580 | .970 | .575 | .810 | .600 |

As will be noted, excellent conversions were obtained in a relatively short period of time. Such high conversions are not obtainable unless the catalyst is matched to the polymerization temperature. In view of the fact that α-methyl styrene is a less active monomer, yields when using large amounts of this material are smaller. However, yields would be still smaller were it not for the choice of cyclohexanone peroxide in this polymerization procedure.

EXAMPLE V

Seventy-five parts by weight of methyl methacrylate and 25 parts by weight of methyl styrene were polymerized using the following polymerization initiators and regulators:

| | Percent |
|---|---|
| Azodiisobutyronitrile | 0.01 |
| Azo-di(cyclohexane-carbonitrile) | 0.19 |
| Tertiary dodecyl mercaptan | 0.30 |

The heating cycle was as follows:

48 hours at 95° C.
16 hours at 115° C.
8 hours at 125° C.

The resulting polymer contained 87.7 percent of insoluble material and had an intrinsic viscosity of .295 thus indicating that a satisfactory product can be obtained in a high yield in three days with azo-di(cyclohexane-carbonitrile) as the principal polymerization catalyst.

EXAMPLE VI

Seventy-five parts by weight of methyl methacrylate and 25 parts by weight of methyl styrene were polymerized as in the preceding example with the following polymerization catalysts and regulators:

| | Percent |
|---|---|
| Azodiisobutyronitrile | 0.01 |
| Azo-di(cyclohexane-carbonitrile) | 0.15 |
| Dicumyl peroxide | 0.04 |
| Tertiary dodecyl mercaptan | 0.30 |

The product contained 89.9 percent of alcohol-insoluble material as determined hereinabove and had an intrinsic viscosity of .305.

EXAMPLE VII

Seventy-five parts by weight of methyl methacrylate and 25 parts by weight of methyl styrene were polymerized as in Example V, using the following polymerization catalysts and regulators:

| | Percent |
|---|---|
| Azodiisobutyronitrile | 0.01 |
| Azo-di(cyclohexane-carbonitrile) | 0.15 |
| Dicumyl peroxide | 0.04 |
| Tertiary dodecyl mercaptan | 0.20 |
| Di(mercaptoethyl) sulfide | 0.10 |

The polymerization product after the three day polymerization period was found to be 91.2 percent alcohol insoluble and had an intrinsic viscosity of .320.

To obtain products having optimum physical properties, the monomeric polymerization mixture should comprise 15–35 parts by weight of α-methyl styrene for each 65–85 parts by weight of methyl methacrylate. The preferred products contain the α-methyl styrene and methyl methacrylate in ratios of 25 parts by weight of the former to 75 parts by weight of the latter. The predominant polymerization temperatures should be within the range of 90°–100° C., 95° C. being the preferred temperature. The heating should continue at least 40 hours or until the polymer has obtained an intrinsic viscosity of at least 0.20, when measured in dioxane. The last stage of the heating cycle is preferably raised to a higher temperature, up to 150° C. A preferred finishing operation is to heat the polymerized material from 100° C. to about 115° C. and hold it at that temperature for a few hours, and then to 125° C. and hold that temperature for another few hours.

Although it is not part of the present invention, the polymerization process described above and the products that are obtained are each further improved by carrying out the polymerization in the presence of an organic disulfide of the formula R—S—S—R', wherein R and R' are alkyl or aryl radicals. The useful alkyl radicals include methyl, ethyl, propyl, isopropyl, butyl, isobutyl, tertiary butyl, amyl, hexyl, octyl and lauryl. The useful aryl radicals include phenyl, tolyl, parachlorophenyl, naphthyl and benzyl. The organic disulfide is used in amounts ranging from 0.01 part by weight of the reaction mixture to as much as 2 parts by weight or percent by weight. These disulfides not only tend to stabilize the final products to thermal degradation but also are regulators of the polymerization process.

It will be seen from the foregoing that the present invention is predicated primarily on the choice of free radical producing catalysts which decompose and yields free radical polymerization initiators over a substantial period of time during the optimum polymerization temperature of 90°–100° C. when using 15–35 parts by weight of α-methyl styrene and 65–85 parts by weight of methyl methacrylate as the essential monomeric pairs. It will be understood, of course, that the polymerization process of the present invention can be carried out with small amounts of other polymerizable compounds such as acrylonitrile, methacrylonitrile, fumaronitrile, styrene, acrylic esters and the like being present as modifying agents. Of course, other modifying agents such as dyes, pigments, lubricants, plasticizers etc., may be added in conventional amounts and manner.

I claim:

1. A method of preparing copolymers of alpha-methylstyrene and methyl methacrylate of increased flow rate when extruded at 475° F. which comprises heating a mixture consisting essentially of 15 to 35 parts by weight of alpha-methylstyrene and 65 to 85 parts by weight of methyl methacrylate as the copolymer pair with 0.1 to 0.5 percent by weight based on the weight of the monomers of a plurality of free radical initiating polymerization catalysts, the heating being characterized by a slow rise from ambient temperature to 90° C., a major heating period of at least forty hours within the range 90° C. to 100° C. during which time monomers are substantially polymerized to an intrinsic viscosity of at least 0.25 when measured in dioxane, followed by heating at higher temperatures up to not more than 150° C. over a minor period of the total polymerization cycle whereby the polymerization is completed, the said free radical initiating catalysts comprising a major amount of one having a half life of ten hours within the temperature range 80° C. to 110° C. and less than 0.1 percent by weight of a catalyst having a half life of ten hours between 60° C. to 75° C.

2. A method of preparing copolymers of alpha-methylstyrene and methyl methacrylate of increased flow rate when extruded at 475° F. which comprises heating a mixture consisting essentially of 15 to 35 parts by weight of alpha-methylstyrene and 65 to 85 parts by weight of methyl methacrylate as the copolymer pair with 0.1 to 0.5 percent by weight based on the weight of the monomers of a plurality of free radical initiating polymerization catalysts, the heating being characterized by a slow rise from ambient temperature to 90° C., a major heating period of at least forty hours within the range 90° C. to 100° C. during which time monomers are substantially polymerized to an intrinsic viscosity of at least 0.25 when measured in dioxane, followed by heating at higher temperatures up to not more than 150° C. over a minor period of the total polymerization cycle whereby the polymerization is completed, the said free radical initiating catalysts comprising a major amount of one having a half life of ten hours within the temperature range 80° C. to 110° C. and less than 0.1 percent by weight of a catalyst having a half life of ten hours between 100° C. to 130° C.

3. A method of preparing copolymers of alpha-methylstyrene and methyl methacrylate of increased flow rate when extruded at 475° F. which comprises heating a mixture consisting essentially of 15 to 35 parts by weight of alpha-methylstyrene and 65 to 85 parts by weight of methyl methacrylate as the copolymer pair with 0.1 to 0.5 percent by weight based on the weight of the monomers of a plurality of free radical initiating polymerization catalysts, the heating being characterized by a slow rise from ambient temperature to 90° C., a major heating period of at least forty hours within the range 90° C. to 100° C. during which time monomers are substantially polymerized to an intrinsic viscosity of at least 0.25 when measured in dioxane, followed by heating at higher temperatures up to not more than 150° C. over a minor period of the total polymerization cycle whereby the polymerization is completed, the said free radical initiating catalysts comprising a major amount of one having a half life of ten hours within the temperature range 80° C. to 110° C. and less than 0.1 percent by weight of a catalyst having a half life of ten hours between 100° C. to 130° C. and 0.01 to 0.1 percent by weight of the polymerizable monomers of a catalyst having a half life of ten hours at 60° C. to 75° C.

4. A method of preparing copolymers of alpha-methylstyrene and methyl methacrylate of increased flow rate when extruded at 475° F. which comprises heating a mixture consisting essentially of 15 to 35 parts by weight of alpha-methylstyrene and 65 to 85 parts by weight of methyl methacrylate as the copolymer pair with 0.1 to 0.5 percent by weight based on the weight of the monomers of a plurality of free radical initiating polymerization catalysts, the heating being characterized by a slow rise from ambient temperature to 90° C., a major heating period of at least forty hours within the range 90° C. to 100° C. during which time monomers are substantially polymerized to an intrinsic viscosity of at least 0.25 when measured in dioxane, followed by heating at higher temperatures up to not more than 150° C. over a minor period of the total polymerization cycle whereby the polymerization is completed, the said free radical initiating catalysts comprising a major amount of cyclohexanone peroxide and 0.01 to 0.1 percent by weight of benzoyl peroxide.

5. A method of preparing copolymers of alpha-methylstyrene and methyl methacrylate of increased flow rate when extruded at 475° F. which comprises heating a mixture consisting essentially of 15 to 35 parts by weight of alpha-methylstyrene and 65 to 85 parts by weight of methyl methacrylate as the copolymer pair with 0.1 to 0.5 percent by weight based on the weight of the monomers of a plurality of free radical initiating polymerization catalysts, the heating being characterized by a slow rise from ambient temperature to 90° C., a major heating period of at least forty hours within the range 90° C.

to 100° C. during which time monomers are substantially polymerized to an intrinsic viscosity of at least 0.25 when measured in dioxane, followed by heating at higher temperatures up to not more than 150° C. over a minor period of the total polymerization cycle whereby the polymerization is completed, the said free radical initiating catalysts comprising a major amount of cyclohexanone peroxide and 0.01 to 0.1 percent by weight of dicumyl peroxide.

6. A copolymer of 25 parts by weight of alpha-methylstyrene and 75 parts by weight of methyl methacrylate characterized by having an intrinsic viscosity of at least 0.25 when measured in dioxane, being substantially uneffected by boiling water, a melt index of at least 30 grams at a shear stress of twenty pounds per square inch at 475° F. when measured in ASTM–D1238 melt viscosity apparatus when prepared by the process of claim 1.

References Cited in the file of this patent

UNITED STATES PATENTS

| 2,647,111 | Shusman | July 28, 1953 |
| 2,656,334 | D'Alelio | Oct. 20, 1953 |
| 3,072,622 | Ham | Jan. 8, 1963 |

FOREIGN PATENTS

| 678,216 | Great Britain | Aug. 27, 1952 |

OTHER REFERENCES

Schramm et al.: Modern Plastics, February 1960, pages 127, 128, 130, 132.

Tobalsky et al.: Organic Peroxides, Interscience (1954), pages 43–44.